6769X
J. RICHARDS.
PUNCHING IRON OR STEEL.
Patented Sept. 28, 1831.
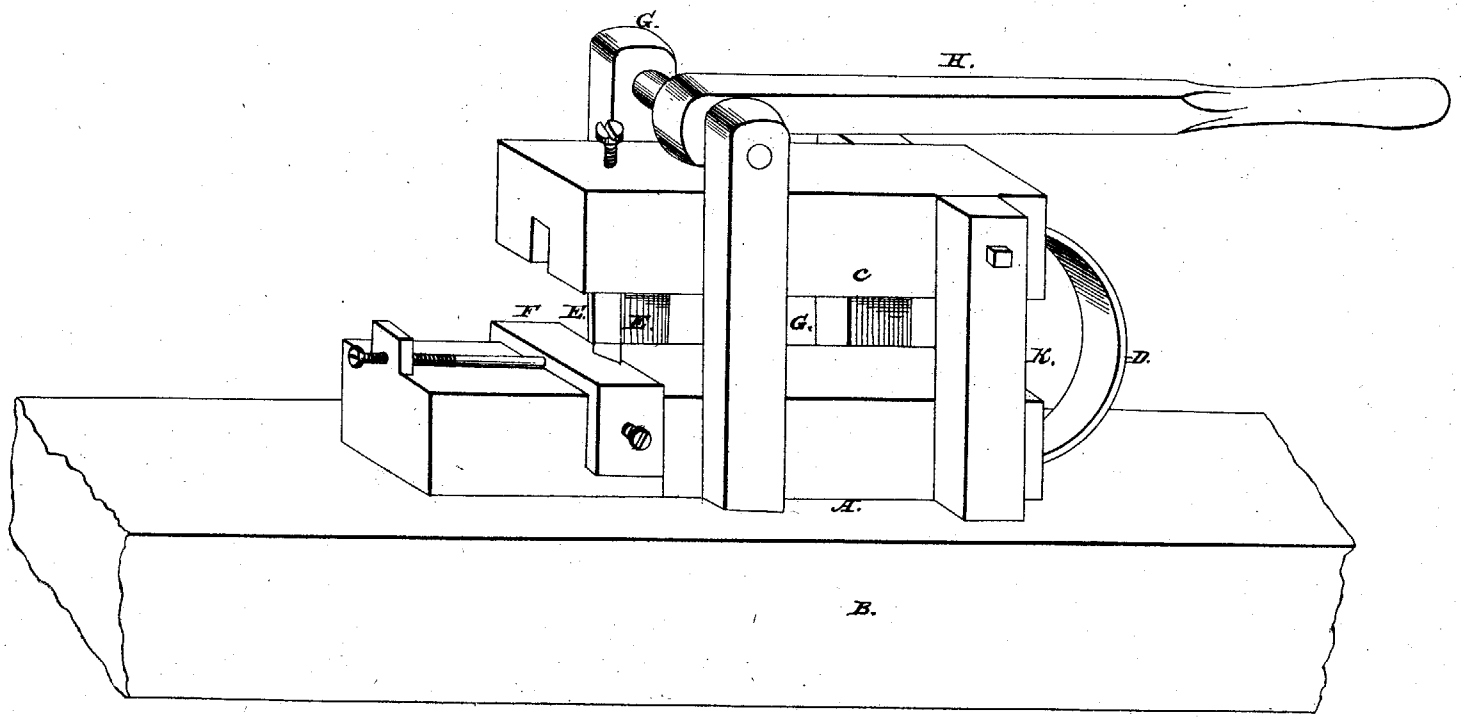
THE NORRIS PETERS CO., PHOTO-LITHO., WASHINGTON, D. C.

Sept 28. 1831 6769X [illegible]

Jedediah Richards. of Elbridge. State of New York.

Letters Patent.

The schedule referred to in these Letters Patent and making part of the same containing a description in the words of the said Jedediah Richards himself of his improvement in the mode of punching or cutting iron & steel by machinery at one operation called the Iron or Steel Cutter or Punch.

To all persons to whom these presents shall come Jedediah Richards of the town of Elbridge County of Onondaga and State of New York Gentleman sends greeting.
Be it known that I the said Jedediah Richards have invented constructed made, and applied to use a new and useful improvement in the mode of Punching or cutting Iron & Steel by machinery at one operation, called the Iron or Steel cutter or Punch. Specified in the words following (viz.)

This improvement is a machine made of iron and consists of the following principally and made in the manner following (viz.) —

I have a piece of iron twelve inches long and two inches square for the bottom part of said machine which lies horizontal, and is fastened firm to a piece of timber. The top piece, is a piece of iron nine inches long and two inches square, lying directly over the bottom piece & leaving a space of 2 inches between them, and having the ends even at the back, and which leaves a projection on the lower piece at the forward end of three inches. These two pieces are connected together at the back end by a circular spring which raises the top piece which also raises the punch or cutter out of the work, in the top piece on the forward end I have my punch or cutter, which is let into the end of the top piece, by a slit or groove in the top piece. the punch or cutter is fastened on to the top piece by a screw and is made with a shoulder that sets directly under the top piece to keep it firm, the punch or cutter stands perpendicular and is worked perpendicular. The die stands on the lower piece & is made of iron & steel which is of sufficient length to reach [illegible]

9/28/1831 6769X the bottom piece & turns down on each side of the lower piece, on each end of the Die, on the part which turns down is a screw [illegible] to guide the die so that the punch or cutter will exactly fit into the die.

On the forward end of the lower piece I have a screw or key to set the die back against the punch or cutter; the Punch & Die may be made of any shape that may be required to make any impression to punch any kind of work. On each side of the top and bottom piece is a strap that reaches above the top piece far enough to support the lever above, the straps are connected together on the under side of the lower piece so that the lever comes up on the lower piece and down on the upper piece, the straps stand directly back of the die The lever works on a bolt that passes through the top of the straps & the end of the lever the lever purchase is on the top of the top piece, the fulcrum for common cutting is one inch, when it rolls under, it brings the fulcrum more perpendicular & shorter and increases the power very much, the lever has a turn down at the fulcrum so that the end stands perpendicular while the lever lies horizontal, There are two iron posts fixed to the bottom piece one inch from the back end (one post on each side) six inches long, a bolt passes through the top of the posts and the end of the top piece for the purpose of supporting the end of the top piece in punching or cutting heavy work, I calculate to use this machine for punching Steam Engine boilers, Wagon and carriage tire, cut mill saw and other saw teeth & repairing old saws, and do all manner of punching Iron & Steel for smith work, In testimony that the above is a true specification of my said improvement as above described, I have hereto set my hand and seal, the twentieth day of August in the year of our Lord one thousand eight hundred and thirty one, Witnesses,
Charles Lombard
Levi Clark Jedediah Richards Enr.d
Chff.

798 h 07